S. Ingersoll,
Spring Scale.
No. 95,588. Patented Oct. 5, 1869.
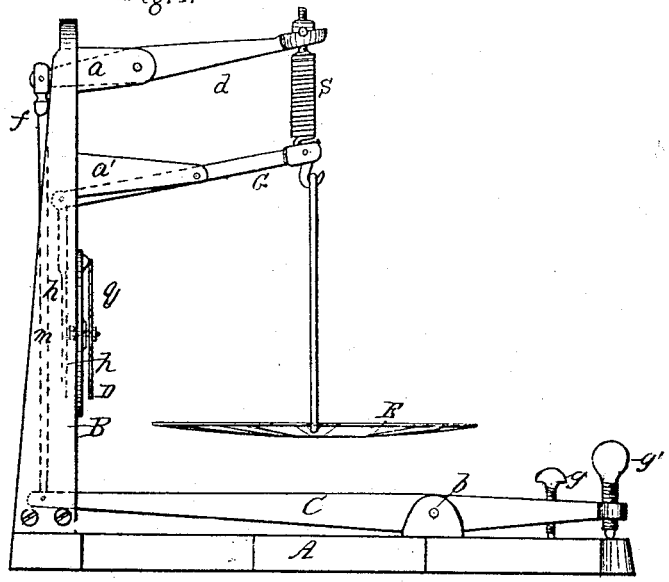
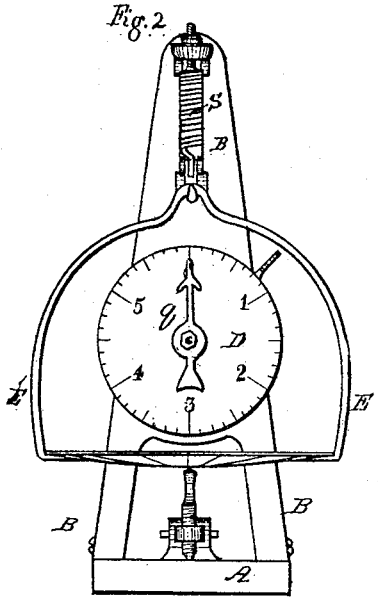
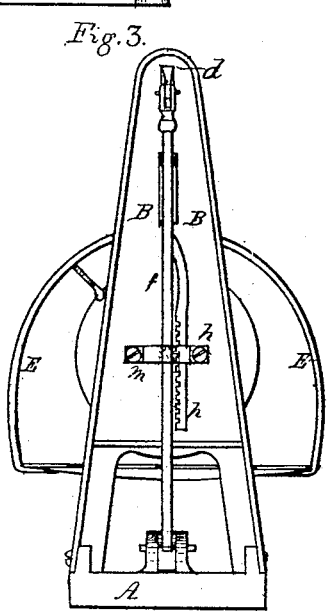
Witnesses
Ashworth
J. V. White
Inventor
S. Ingersoll
by
J. H. Alexander
Atty.

United States Patent Office.

SIMON INGERSOLL, OF BROOKLYN, NEW YORK.

Letters Patent No. 95,588, dated October 5, 1869.

IMPROVEMENT IN SPRING-SCALES.

The Schedule referred to in these Letters Patent and making part of the same.

*To all whom it may concern:*

Be it known that I, SIMON INGERSOLL, of Brooklyn, in the county of Kings, and State of New York, have invented certain new and useful Improvements in Spring-Scales for Weighing; and I do hereby declare that the following is a full, clear, and exact description thereof, reference being had to the accompanying drawings, and to the letters of reference marked thereon, which form a part of this specification, in which—

Figure 1, in the annexed drawings, represents a side elevation of scales and frame.

Figure 2 is a front view of the same.

Figure 3 represents a rear view.

The nature of my invention consists in the improvement of spring-scales, when constructed with the combination of devices hereinafter described.

A represents the base of the frame.

B is an upright, secured to the base by means of screws.

C designates a horizontal beam pivoted between the semicircular elevations $b\ b$, and extending from the front end to near the rear end of base A.

The beam C is sufficiently raised above the base A to admit of a limited vertical play.

$d$ and G represent two levers, having their fulcra at the front end of the arms $a$ and $a'$, the said arms being attached to upright B.

The levers $d$ and G will pass through slots in upright B, at their rear end.

$f$ represents a metal rod, pivoted, at its upper end, to the outer end of lever $d$, and its lower end to beam C.

To the outer end of lever G is pivoted the rack-bar $h$, the said rack-bar being made to gear in pinion $m$, which plays in a block fastened to upright B.

The axle of pinion $m$ penetrates upright B, dial-plate D, and, at its end, is secured to the hand or indicator $q$.

$s$ designates a spiral spring, to the top of which is attached a cap, with a screw-bolt, $t$, secured to it.

The said screw-bolt will go upward through lever $d$, and is furnished with a nut, by the operation of which the lever $g$ can be depressed or elevated, as will be hereafter seen.

V represents a hook, pivoted at the inner end of lever G. On this hook the bail E and scale E' are suspended.

The lower end of spring $s$ terminates in a hook, which embraces the pivot that confines hook V in its place.

$g\ g'$ represent two thumb-screws, $g$ being chiefly designed to keep the hand $q$ at zero.

G, by its operation, will control the vertical motion of beam C.

E designates the scale for holding the object to be weighed.

In operating my scales, the weight being placed on the scale E', the bar G will descend to a degree proportioned to that weight, and to the strength of spring $s$. As the inner end of lever G descends, the outer end, to which is attached the rack-bar $h$, will ascend and operate pinion $m$. Pinion $m$, in turn, will act on the hand and indicate the weight on the dial.

By the operation of the nut on spring $s$, the scale can be made to weigh heavy or light at pleasure.

The dial D, it will be observed, can be moved around on its pivot by means of a thumb-piece, X, attached to its periphery, and, in weighing butter or lard, the vessel in which it is contained will be first laid on the scale E', and the thumb-piece X used to indicate its weight. The butter will be then put into the vessel, and the difference between the hand $q$ and the thumb-piece will be the net weight of the article.

A modification of my invention may be made by dispensing with beam C, and using a set-screw to regulate lever $d$.

Having thus described my invention,

What I claim, and desire to secure by Letters Patent, is—

1. The lever G, in combination with rack-bar $h$, pinion $m$, spiral spring $s$, and lever $d$, all arranged to operate substantially as described.

2. A scale, consisting of base A, upright B, beam C, rod $f$, levers $d$ and G, rack-bar $h$, pinion $m$, and spring $s$, dial-plate D and bail E, the whole arranged to operate substantially as set forth.

In testimony that I claim the foregoing as my own, I affix my signature, in presence of two witnesses.

SIMON INGERSOLL.

Witnesses:
PHILIP FITZSIMMONS,
NICHLAS BUCKHABER.